(12) United States Patent
Cormack et al.

(10) Patent No.: US 8,671,400 B2
(45) Date of Patent: Mar. 11, 2014

(54) PERFORMANCE ANALYSIS OF SOFTWARE EXECUTING IN DIFFERENT SESSIONS

(75) Inventors: Christopher J. Cormack, Hillsboro, OR (US); Nathaniel Duca, Menlo Park, CA (US); Joseph D. Matarazzo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 12/645,629

(22) Filed: Dec. 23, 2009

(65) Prior Publication Data

US 2011/0154310 A1    Jun. 23, 2011

(51) Int. Cl.
*G06F 13/00* (2006.01)
*G06F 13/28* (2006.01)
*G06F 15/00* (2006.01)
*G06F 9/44* (2006.01)
*G06F 9/45* (2006.01)

(52) U.S. Cl.
USPC ........... 717/154; 711/125; 712/206; 717/128; 717/129; 717/130; 717/133; 717/149; 717/151; 717/158

(58) Field of Classification Search
None
See application file for complete search history.

(56) References Cited

U.S. PATENT DOCUMENTS

| | | | |
|---|---|---|---|
| 6,058,265 A | 5/2000 | Bishop | |
| 6,539,339 B1 * | 3/2003 | Berry et al. | 717/130 |
| 7,810,083 B2 * | 10/2010 | Chinya et al. | 717/149 |
| 2004/0111708 A1 | 6/2004 | Calder et al. | |
| 2004/0154012 A1 * | 8/2004 | Wang et al. | 717/158 |
| 2004/0205747 A1 * | 10/2004 | Bernstein et al. | 717/174 |
| 2005/0177819 A1 * | 8/2005 | Ober et al. | 717/128 |
| 2005/0183070 A1 * | 8/2005 | Alexander et al. | 717/133 |
| 2005/0246691 A1 * | 11/2005 | Hsieh et al. | 717/129 |
| 2006/0101421 A1 * | 5/2006 | Bodden et al. | 717/130 |
| 2007/0157177 A1 * | 7/2007 | Bouguet et al. | 717/128 |
| 2007/0271556 A1 * | 11/2007 | Eggers et al. | 717/151 |
| 2008/0134205 A1 | 6/2008 | Bansal et al. | |
| 2008/0244534 A1 * | 10/2008 | Golender et al. | 717/128 |
| 2008/0270758 A1 * | 10/2008 | Ozer et al. | 712/206 |
| 2010/0274972 A1 * | 10/2010 | Babayan et al. | 711/125 |

OTHER PUBLICATIONS

Rong-Tai Liu et al., A Fast Pattern-Match Engine for Network Processor-Based Network Intrusion Detection System, 2004, [Retrieved on Oct. 10, 2013]. Retrieved from the internet: <URL: http://ieeexplore.ieee.org/stamp/stamp.jsp?tp=&arnumber=1286432> 5 Pages (1-5).*

Florent Teichteil-Konigsbuch et al., A Multi-Thread Decisional Architecture for Real-Time Planning Under Unceatinty, 2007, [Retrieved on Oct. 10, 2013]. Retrieved from the internet: <URL: http://archive.cecs.anu.edu.au/satellite-events-icaps07/workshop3/paper17.pdf> 6 Pages (1-6).*

British Patent Office, Combined Search and Examination Report issued in corresponding GB Application No. GB1021591.1, dated Apr. 12, 2011, 9 pgs.

* cited by examiner

*Primary Examiner* — Don Wong
*Assistant Examiner* — Anibal Rivera
(74) *Attorney, Agent, or Firm* — Trop, Pruner & Hu, P.C.

(57) ABSTRACT

A technique includes providing first objects that are associated with an application session and in a processor-based system, identifying second objects in another application session corresponding to the first objects based at least in part on a comparison of the second objects to matching rules associated with the first objects.

18 Claims, 4 Drawing Sheets

PERFORMANCE ANALYSIS OF SOFTWARE EXECUTING IN DIFFERENT SESSIONS

BACKGROUND

Modern general purpose and graphics processors may include one or more processing cores, and these processing cores may run a relatively large number of threads. Therefore, analyzing the performance of a multi-core processor may involve a complex undertaking given the number of tasks and the number of different threads that may be running.

Analyzing the performance of certain software may involve capturing a buffer of what each thread does in the process and using analysis tools to generate reports and visualizations of what occurred in the application. Challenges arise in comparing data collected across different application sessions, called "differencing."

More specifically, conventionally, in a serially-executed application, differencing is relatively straightforward because the relative sequence of function calls or tasks is usually deterministic. As a result, a conventional differencing algorithm may scan the list of records in the file to do a relatively quick correspondence between records. However, in parallel-executed applications, the assignment of tasks to threads is rarely deterministic. Similarly, when a task executes on a given thread is equally nondeterministic. As a result, even in two runs of an application that were passed the exact same input, it is relatively hard to determine one-to-one correspondences between individual tasks.

DETAILED DESCRIPTION

Figure 1:
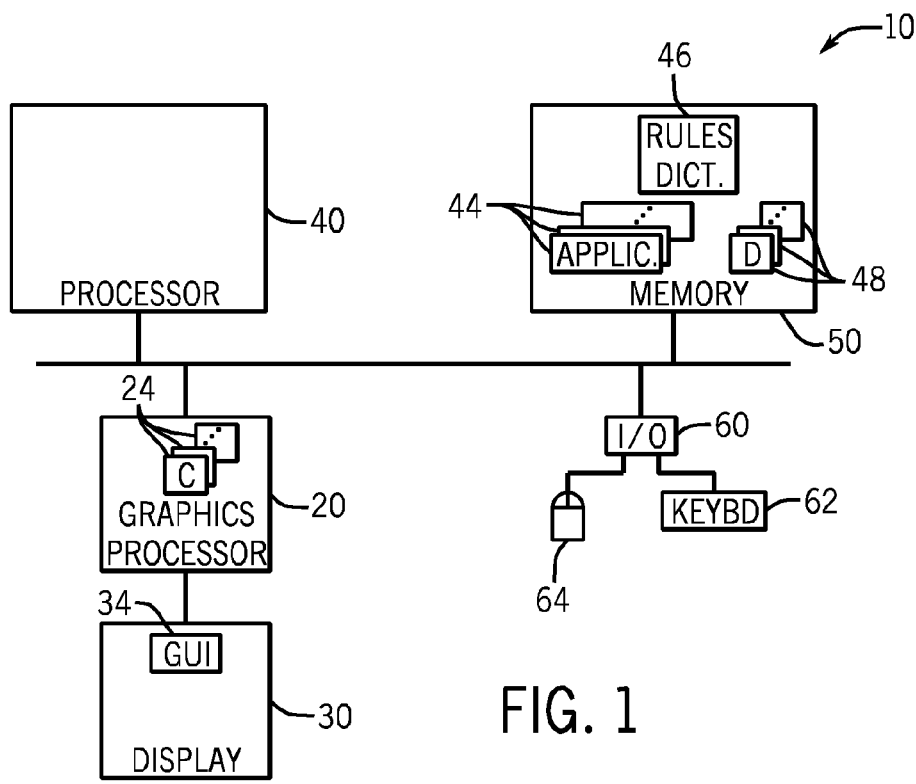
FIG. 1 is a schematic diagram of a computer system according to an embodiment of the invention.

Referring to FIG. 1, in accordance with embodiments of the invention described herein, a system 10 includes a graphics processor 20 that has multiple processing cores 24. The processing cores 24 may execute a particular application at different times and in different sessions. Because the processing of the application occurs on different threads, when a particular task of the application executes on a given thread is non-deterministic, and furthermore, the assignment of tasks to the threads is usually not deterministic as well. As a result, it is challenging to determine a one-to-one correspondence between identical tasks in different application sessions. However, as described herein, the system 10 employs a matching rules dictionary 46 for purposes of matching the tasks in one particular application session with the tasks in the other application session. By correlating the tasks in the two application sessions, differencing information may be obtained.

It is noted that the multi-core graphics processor 20 is merely an example of a multi-core processor, as the multi-core processor described herein may be a multi-core processor other than a graphics processor, such as a single instruction multiple data (SIMD) multi-core processor or a main system processor 40 of the system 10, as non-limiting examples.

In the context of this application, a task is any common unit of work for scheduling and execution. The task may be any portion of code with a beginning and an end, and the duration of the task may be defined as a number of cycles to execute the task. In general, the task is one type of object, which is analyzed by the system 10 in a profile that is generated for purposes of comparing the execution of the application at different times.

For example, the execution time or cache misses associated with a task in a first application session may be compared with the execution time or cache misses of the corresponding task in another application session. The system 10 may display the results of the differencing so that a programmer may, for example, use the results for purposes of analyzing execution of the particular application at different times or in different execution environments, assess software changes to a particular task, etc.

Figure 4:
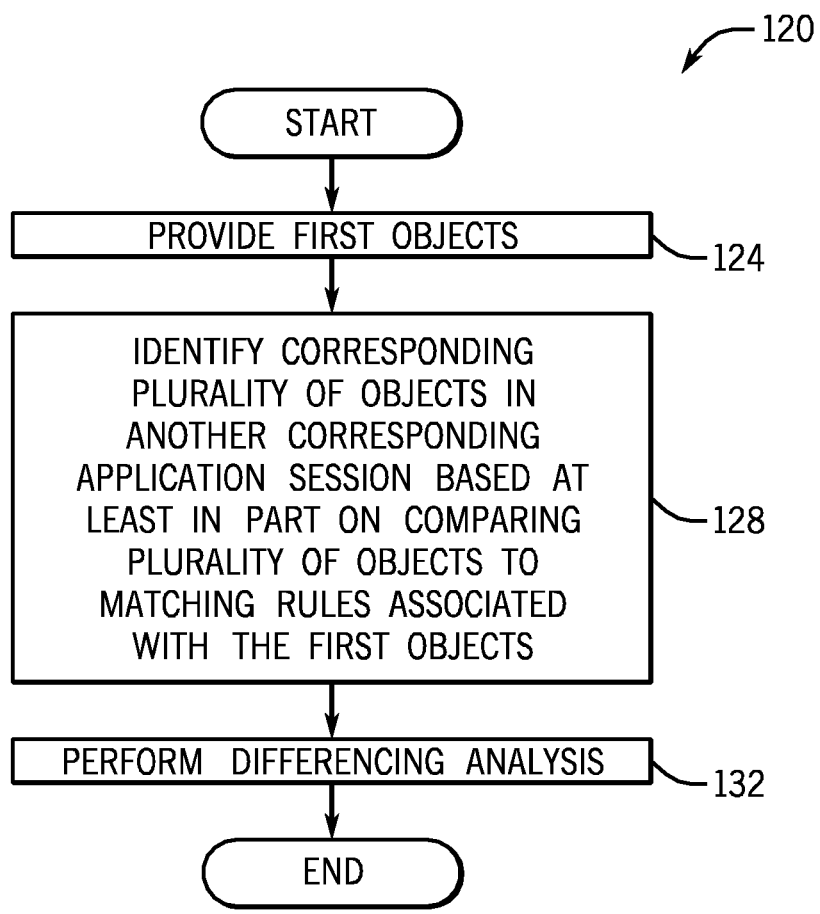
FIG. 4 is a flow chart depicting a technique to perform a differencing analysis according to an embodiment of the invention.

In accordance with some embodiments of the invention, a technique 120, which is depicted in FIG. 4 may be used for purposes of performing differencing analysis. Referring to FIG. 4 in conjunction with FIG. 1, in accordance with the technique 120, the system provides (block 124) first objects (tasks, for example) that are associated with a particular application session. The technique 120 includes identifying (block 128) corresponding objects of a plurality of objects in another application session based at least in part on comparisons of the plurality of objects to matching rules, which are associated with the first tasks. When the correspondences between both sets of tasks are noted, a performance differencing analysis may then be performed, pursuant to block 132.

For the examples described below, it is assumed that the objects for the differencing analysis are tasks. However, techniques and systems that are disclosed herein may likewise be applied to other objects, in accordance with other embodiments of the invention.

Figure 2:
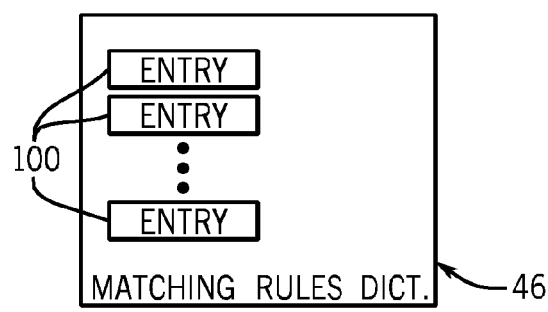
FIG. 2 is an illustration of a matching rules dictionary according to an embodiment of the invention.
Figure 3:
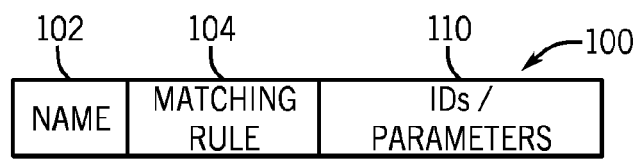
FIG. 3 is an illustration of an entry of the dictionary of FIG. 2 according to an embodiment of the invention.

Referring to FIG. 2 in conjunction with FIG. 1, in accordance with some embodiments of the invention, the matching rules dictionary 46 has entries 100, and each entry 100 is associated with a particular task. Referring also to FIG. 3, in accordance with some embodiments of the invention, each entry 100 includes a name field 102, which contains data indicative of the name of a particular task. It is assumed for purposes of this example that the name of a particular task does not change between application sessions. The entry 100 further includes a matching rule field 104, which contains data that is indicative of a rule to apply when considering whether a match occurs.

For example, a particular matching rule may dictate that task matches are evaluated based on task identifications (IDs). Although such a rule may be helpful in some instances, in other instances, task IDs may change between application sessions and thus may not be helpful for matching purposes. For example, in a particular application session, the ID for a particular task may be "object 46." However, in a subsequent application session, the same task may be assigned an ID of "object 48." As such, a matching rule, other than one that is based on a task ID match, may be used, in accordance with other embodiments of the invention.

As another example, the matching rule may specify that task matches are evaluated based on a particular task parameter, instead of on task ID. In this regard, a parameter is any kind of normal data type or structure that has a temporal or functional relationship to the task. As non-limiting examples, the parameter may be a buffer, a name-value pair or a string. In general, the parameter has a particular association to the task, and this association does not change between application sessions.

As depicted in FIG. 3, in addition to the fields 102 and 104, the entry 100 includes a field 110 that contains data indicative of the IDs or parameters that are used for the matching of the associated task. Whether the data in the field 110 identifies IDs or parameters depends on the particular matching rule.

In this regard, in accordance with some embodiments of the invention, each unique task has a unique name and an associated matching rule that is described by the corresponding entry 100 in the matching rules dictionary 46. When a matching analysis is performed on a given task, the name of the given task is searched in the matching rules dictionary 46; and when a corresponding entry 100 is found, the IDs or parameters (depending on the matching rule) indicated by the entry 100 are used to identify a match. Thus, if the matching rule specifies that the match is to be evaluated based on task ID, then the IDs indicated by the entry 100 are examined to identify a match; and if the matching rule sets forth that the matching is to be based on a particular parameter, then the parameters indicated by the entry 100 are examined to identify a potential match.

Referring back to FIG. 1, among the features of the system 10, the processor 40 may be a main control unit of the system 10 and may contain one or more microprocessors, in accordance with some embodiments of the invention. Furthermore, the processor 40 may or may not contain multiple processing cores, in accordance with other embodiments of the invention. In general, the processor 40 may execute application program code 44 that is stored in a system memory 50 for purposes of performing differencing analysis. However, this is merely an example, as in accordance with other embodiments of the invention, one or more of the processing cores 24 of the graphics processor 20 may perform the differencing analysis. Thus, many variations are contemplated and are within the scope of the appended claims. As shown in FIG. 1, in accordance with some embodiments of the invention, the memory 50 may store various data sets 48 related to initial, intermediate and final processing results associated with the differencing analysis.

In accordance with some embodiments of the invention, the system 10 may include a display 30 that may be coupled to the graphics processor 20 for purposes of displaying a particular graphical user interface (GUI) 34. In general, the GUI 34 may be used to display particular objects or tasks to the user such that the task may be selected (via an input/output (I/O) devices, such as a mouse 64 or keyboard 62 that are coupled to an I/O interface 60, for example) for purposes of selecting a particular object or task for analysis. Furthermore, the user may select a group of tasks that may be associated with a higher level software object, for example. And that result is that the user may select a group of tasks that the differencing analysis uses. Thus, the tasks that are selected are tracked between different application sessions for purposes of performing the differencing analysis.

The GUI 34 may also be used, in accordance with some embodiments of the invention, for purposes of displaying the results of the differencing analysis. For example, in accordance with some embodiments of the invention, the GUI 34 may display a histogram illustrating relative execution times, cache misses, etc., between different application sessions for the selected group of tasks.

It is noted that FIG. 1 depicts merely an exemplary system architecture to illustrate the differencing analysis and task tracing between different application sessions. Thus, the system 10 may employ a variety of different architectures not shown or described herein, as can be appreciated by one of skill in the art.

Figure 5:
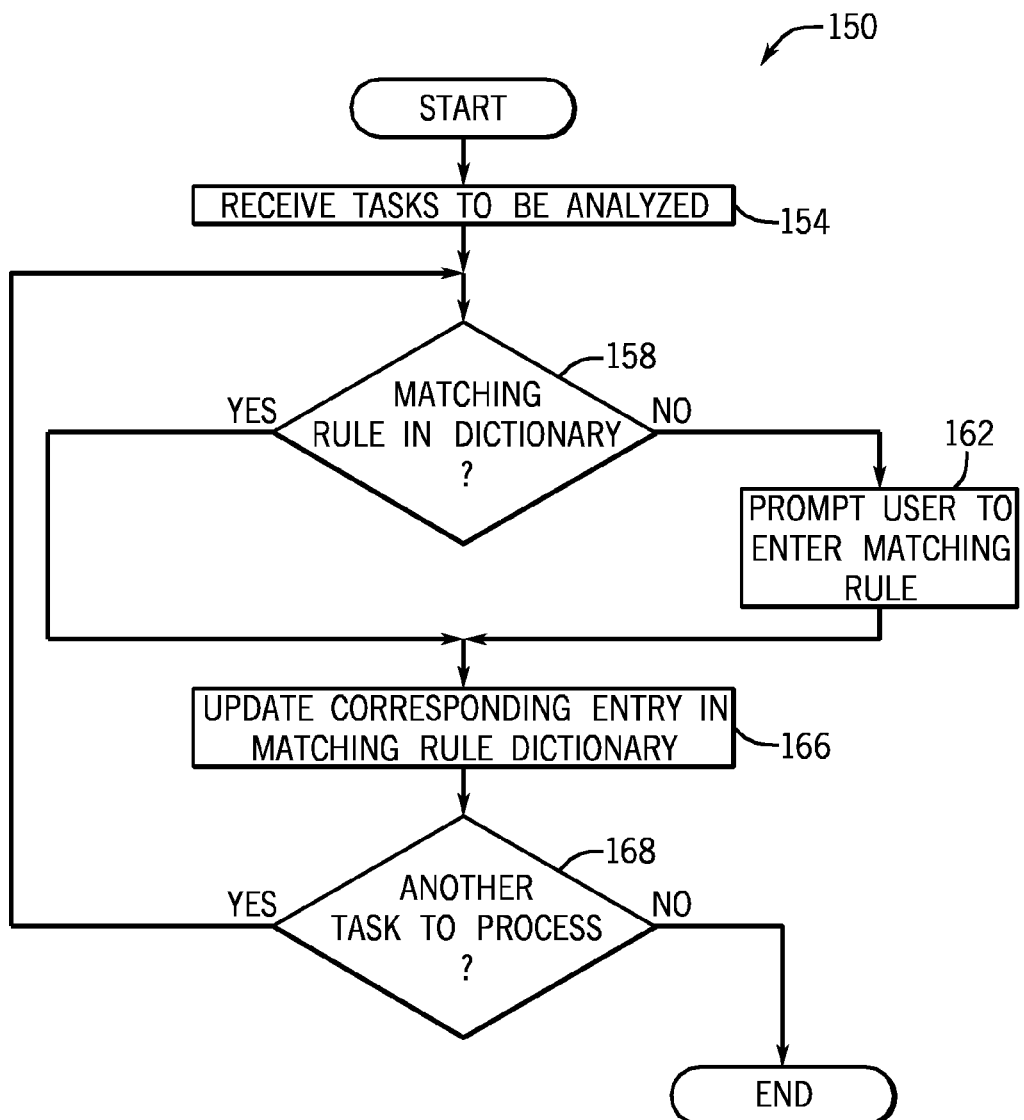
FIG. 5 is a flow chart depicting a technique to populate the matching rules dictionary with entries according to an embodiment of the invention.

Referring to FIG. 5 in conjunction with FIG. 1, in accordance with some embodiments of the invention, the system 10 may perform a technique 150 for purposes of creating new entries 100 and updating existing entries 100 (see FIGS. 2 and 3) in the matching rules dictionary 46. The technique 150 may be performed, for example, as part of a differencing program when a set of tasks that are associated with a particular application session are scanned for purposes of later identifying the same tasks in another application session. Pursuant to the technique 150, tasks are identified, pursuant to block 154, which are to be analyzed for the differencing analysis.

The tasks that are to be analyzed may be selected, for example, through user interaction with the GUI 30 (FIG. 1). In this manner, the user may use the keyboard 62 and/or mouse 64 to highlight and select a particular software function, task, group of tasks, etc. This selection, in turn, identifies one or more tasks that are subject to the differencing analysis.

The technique 150 includes, for each task, determining whether a corresponding matching rule (and thus, a corresponding entry 100) exists in the matching rules dictionary 46, pursuant to diamond 158. If not, then a corresponding entry 100 (see FIGS. 2 and 3) is created in the matching rules dictionary 46, and the user is prompted (block 162) to enter to the corresponding matching rule so that the entry 100 may be updated with the rule. Next, the entry 100 is updated, pursuant to block 166, with the parameter or ID (depending on the matching rule) associated with the current task.

Thus, for a task whose name corresponds to an existing entry 100, the technique 150 updates the entry 100 to further reflect the ID or parameter associated with the task; and for a task whose name does not correspond to an existing entry 100, the technique 150 creates a new entry 100 with the associated ID or parameter.

The technique 150 concludes by determining (block 168) whether another task is to be processed, and if so, control returns to diamond 158.

Figure 6:
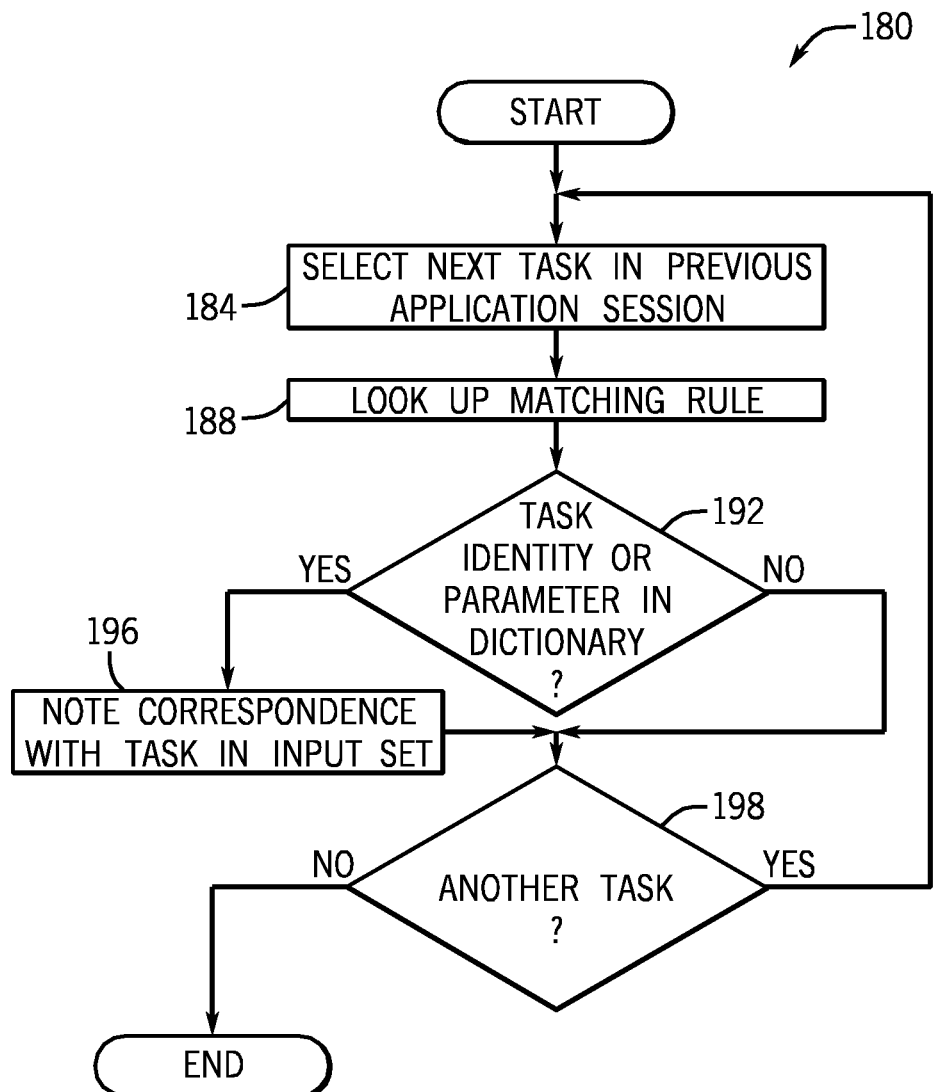
FIG. 6 is a flow chart depicting a technique to identify and match corresponding objects in different application sessions according to an embodiment of the invention.

After the matching rules dictionary 46 has been updated, the differencing program may then begin a search of the tasks in the other application session, in a technique 180 that is depicted in FIG. 6. Referring to FIG. 6 in conjunction with FIG. 1, pursuant to the technique 180, the next task in this application session is selected, pursuant to block 184, and the corresponding entry 100 (see FIGS. 2 and 3) in the matching rules dictionary 46 is retrieved for purposes of looking up the corresponding matching rule, pursuant to block 188. If a determination is then made that the corresponding ID or parameter is in the matching rules dictionary 46 (diamond 192), i.e., if the ID or parameter is indicated by the corresponding entry 100, then the task correspondence is noted, as set forth in block 196 and control proceeds to diamond 198. If the corresponding ID or parameter is not in the matching rules dictionary 46 (diamond 192), then control also proceeds to diamond 198, where a determination if made whether another task is to be processed. If another task is to be processed, then control returns to block 184.

Other embodiments are contemplated and are within the scope of the appended claims. For example, in accordance with other embodiments of the invention, the matching rule may not be based solely on a single parameter or ID, but instead, the match may be based on a combinatorial rule. For example, a particular matching rule may set forth an ID and then further refine it with a parameter. That is, identifiers are unique within the hierarchy (based on some lineage) but not unilaterally unique. Other variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   providing identification of first objects associated with execution of an application in a first application session; and
   in a processor-based system, identifying second objects corresponding to the first objects, the second objects being associated with execution of the application in a second application session and at a different time than the first application session and the identifying comprising retrieving and applying matching rules, at least one of the matching rules being associated with a given first object of the first objects and identifying how a comparison is to be made between the given first object and a given second object of the second objects to identify whether the given second object corresponds to the given first object.

2. The method of claim 1, wherein the objects comprise tasks.

3. The method of claim 1, further comprising:
   performing a differencing analysis based at least in part on the identified second objects.

4. The method of claim 3, wherein the act of performing the differencing analysis comprises:
   determining differences in execution times between the first and second objects.

5. The method of claim 1, further comprising:
   storing the matching rules in a dictionary.

6. The method of claim 1, wherein each of the matching rules comprises a rule identifying a comparison to be made with an association with one of the first objects.

7. The method of claim 6, wherein the association comprises a parameter or identity of the object.

8. A system comprising:
   a multi-core processor to execute first objects associated with an application in a first application session and execute second objects associated with the application in a second application session at a different time than the first application session; and
   a differencing analyzer to retrieve matching rules associated with the first objects and apply criteria indicated by the matching rules to identify the second objects that correspond to the first objects, at least one of the matching rules being associated with a given first object of the first objects and identifying how a comparison is to be made between the given first object and a given second object of the second objects to identify whether the given second object corresponds to the given first object.

9. The system of claim 8, wherein the differencing analyzer performs a differencing analysis based at least in part on the identified objects in the second application session.

10. The system of claim 9, wherein the differencing analyzer determines differences in execution times in the differencing analysis.

11. The system of claim 8, wherein the differencing analyzer is adapted to determine at least one of the matching rules and store the at least one of the matching rules in a dictionary.

12. The system of claim 8, wherein the multi-core processor comprises a graphics processor.

13. An article comprising a computer readable storage medium storing instructions that when executed by a computer cause the computer to:
   provide identification of first objects associated with execution of an application in a first application session; and
   identify second objects corresponding to the first objects, the second objects being associated with execution of the application in a second application session and at a different time than the first application session and the identifying comprising retrieving and applying matching rules associated with the first objects and comparing criteria indicated by the matching rules to identify the second objects that correspond to the first objects, at least one of the matching rules being associated with a given first object of the first objects and identifying how a comparison is to be made between the given first object and a given second object of the second objects to identify whether the given second object corresponds to the given first object.

14. The article of claim 13, wherein the objects comprise tasks.

15. The article of claim 13, the storage medium storing instructions to cause the computer to perform a differencing analysis based at least in part on the identified second objects.

16. The article of claim 15, the storage medium storing instructions to cause the computer to determine differences in execution times between the first and second tasks.

17. The article of claim 13, the storage medium storing instructions to cause the computer to:
   for at least one of the first objects, determine the associated matching rule and store the associated matching rule in a dictionary.

18. The article of claim 13, wherein the matching rule comprises a rule identifying a comparison to be made with an association of the first object.

* * * * *

UNITED STATES PATENT AND TRADEMARK OFFICE
CERTIFICATE OF CORRECTION

| | | |
|---|---|---|
| PATENT NO. | : 8,671,400 B2 | Page 1 of 1 |
| APPLICATION NO. | : 12/645629 | |
| DATED | : March 11, 2014 | |
| INVENTOR(S) | : Cormack et al. | |

It is certified that error appears in the above-identified patent and that said Letters Patent is hereby corrected as shown below:

In the Claims

Col. 5:
Line 25, Claim 1 after "rules" and before the "," insert --associated with the first objects and comparing criteria indicated by the matching rules to identify the second objects that correspond to the first objects--

Signed and Sealed this
Eighth Day of July, 2014

Michelle K. Lee
*Deputy Director of the United States Patent and Trademark Office*